United States Patent [19]

Saegusa

[11] Patent Number: 5,649,240
[45] Date of Patent: Jul. 15, 1997

[54] CAMERA HAVING A DEVICE FOR SETTING PLURAL MODES OF CAMERA OPERATION WITH A SINGLE OPERATING MEMBER

[75] Inventor: Takashi Saegusa, Kawasaki, Japan

[73] Assignee: Nikon Corporation, Tokyo, Japan

[21] Appl. No.: 649,835

[22] Filed: Apr. 30, 1996

[30] Foreign Application Priority Data

Jun. 13, 1995 [JP] Japan ................................. 7-146097

[51] Int. Cl.$^6$ ........................................... G03B 13/36
[52] U.S. Cl. ........................... 396/124; 396/130; 396/137
[58] Field of Search ................................. 354/402, 409, 354/400, 289.1, 289.12, 408; 396/121, 124, 130, 137

[56] References Cited

U.S. PATENT DOCUMENTS

4,942,418  7/1990  Norita et al. ........................... 354/408

Primary Examiner—W. B. Perkey

[57] ABSTRACT

A camera having a device for setting plural modes of camera operation with a single operating member. The camera operates in various modes of operation, including a first focus detection region mode in which focus detection of a photographic lens is performed in a first focus detection region in a photographic picture plane, and a second focus detection region mode in which focus detection of a photographic lens is performed in a second focus detection region which is narrower than the first focus detection region. The camera also operates in plural focusing adjustment modes of operation, including a first drive mode in which further focusing adjustment movement of the lens is inhibited once the photographic lens has been focused, and a second drive mode in which focus adjustment movement continues even after focusing of the photographic lens. The various combinations of the focus detection region modes and the focus adjustment modes are changed by the single operating member.

16 Claims, 6 Drawing Sheets

| SET POINTER | AF DRIVE MODE | FOCUS DETECTION REGION MODE | DISPLAY |
|---|---|---|---|
| 0 | SINGLE | WIDE | [ ] AF S |
| 1 | SINGLE | SPOT | O AF S |
| 2 | CONTINUOUS | SPOT | O AF C |
| 3 | CONTINUOUS | WIDE | [ ] AF C |

| SET POINTER | AF DRIVE MODE | FOCUS DETECTION REGION MODE | DISPLAY |
|---|---|---|---|
| 0 | SINGLE | WIDE | [ ] AF |
| 1 | SINGLE | SPOT | o AF |
| 2 | CONTINUOUS | WIDE | [ ] AF$_C$ |

FIG. 10

| SET POINTER | AF DRIVE MODE | FOCUS DETECTION REGION MODE | DISPLAY |
|---|---|---|---|
| 0 | SINGLE | WIDE | [ ] AF S |
| 1 | SINGLE | SPOT | O AF S |
| 2 | CONTINUOUS | SPOT | O AF C |
| 3 | CONTINUOUS | WIDE | [ ] AF C |
| 4 | AUTOMATIC CHANGEOVER | WIDE | [ ] AF S / [ ] AF C |

FIG. 11

CAMERA HAVING A DEVICE FOR SETTING PLURAL MODES OF CAMERA OPERATION WITH A SINGLE OPERATING MEMBER

BACKGROUND OF THE INVENTION

1. Field of the Invention

The present invention relates to a device for setting camera operation modes, and, more particularly, the present invention relates to a device for setting plural modes of camera operation with a single operating member.

2. Description of the Related Art

Cameras are known having a focus detection device to detect a focus state of a photographic lens. In the known cameras having a focus detection device, a focus detection region is arranged in the photographic picture plane, and focus detection is performed in either a wide portion or a narrow portion within the focus detection region according to the subject. An automatic focus adjustment device (hereinafter referred to as an "autofocus device" or "AF device") performs focus adjustment of the photographic lens based on the detection results of the focus detection device. The autofocus device operates in either a single autofocus (AF) mode in which the focus adjustment movement of the photographic lens is inhibited once the lens is focused, or a continuous AF mode in which the focus adjustment of the photographic lens continues to track the subject, even after the lens is focused.

A camera having the above-described types of focus detection device and autofocus device also includes separate mode setting devices to set the autofocus mode and to set the focus detection region mode. More particularly, to change the autofocus mode requires operation of a first operating member and to change the focus detection region mode requires operation of a second operating member different from the first operating member. The separate operating members must be operated individually to set the respective modes of operation.

As a result of the separate operating members required to set respective modes of operation, the prior art mode setting device suffers from the disadvantage of poor operability because respective separate operating members for setting the autofocus mode and the focus detection region mode require a large amount of space and increased cost of manufacture.

SUMMARY OF THE INVENTION

It is an object of the present invention to provide a camera having a single operating member to control both an operation of setting a focus adjustment mode and an operation of setting a focus detection region mode.

Additional objects and advantages of the present invention will be set forth in part in the description which follows, and, in part, will be obvious from the description, or may be learned by practice of the invention.

Objects and advantages of the present invention are attained with a camera including a mode setting device for setting plural modes of a camera operation with a single operating member. The single operating member can set both a focus detection region mode of operation and a focus adjustment mode of operation. More specifically, the camera includes a focus detection device and a focus adjustment device. The focus detection device detects a focus state of a photographic lens, and the focus adjustment device performs focus adjustment of a photographic lens based on the detection results of a focus detection device. The focus adjustment device and the focus detection device each have plural modes of operation, and the mode setting device sets both a focus detection region mode of operation and a focus adjustment mode of operation.

More particularly, the focus detection device operates in one of a first focus detection region mode in which focus detection of a photographic lens is performed in a first focus detection region of a photographic picture plane and a second focus detection region mode in which focus detection of a photographic lens is performed in a second focus detection region of the photographic picture plane which is narrower than the first focus detection region. The focus adjustment device operates in one of plural focus adjustment modes, including a first drive mode in which, once the photographic lens has been focused, further focus adjustment movement is inhibited, and a second drive mode in which focus adjustment movement is continued even after focusing the photographic lens. Various combinations of the plural focus detection region modes and the plural focus adjustment modes are selected and changed by the single operating member.

In accordance with an embodiment of the present invention, the mode setting device includes an initial setting state in which a combination of the first focus detection region mode and the first drive mode is set.

In accordance with an embodiment of the present invention, the mode setting device changes the respective modes of operation of the focus adjustment device and the focus detection device individually, and not simultaneously, in connection with rotation of the single operating member.

In accordance with an embodiment of the present invention, the mode setting device excludes a setting of a combination of the second drive mode and the second focus detection region mode.

In accordance with an embodiment of the present invention, the data setting device sets and changes the combination of the plural focus detection region modes and the plural focus adjustment modes using a single operating member.

In accordance with an embodiment of the present invention, in an initialization state of the camera, the mode setting device sets the most frequently used combination of the first focus detection region mode and the first drive mode.

In accordance with an embodiment of the present invention, the mode setting device excludes setting the combination of the second drive mode and the second focus detection region mode, thereby omitting a combination of modes infrequently used.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

Reference will now be made in detail to the preferred embodiments of the present invention, examples of which are illustrated in the accompanying drawings wherein like reference numerals refer to the same or similar elements throughout.

Figure 1:
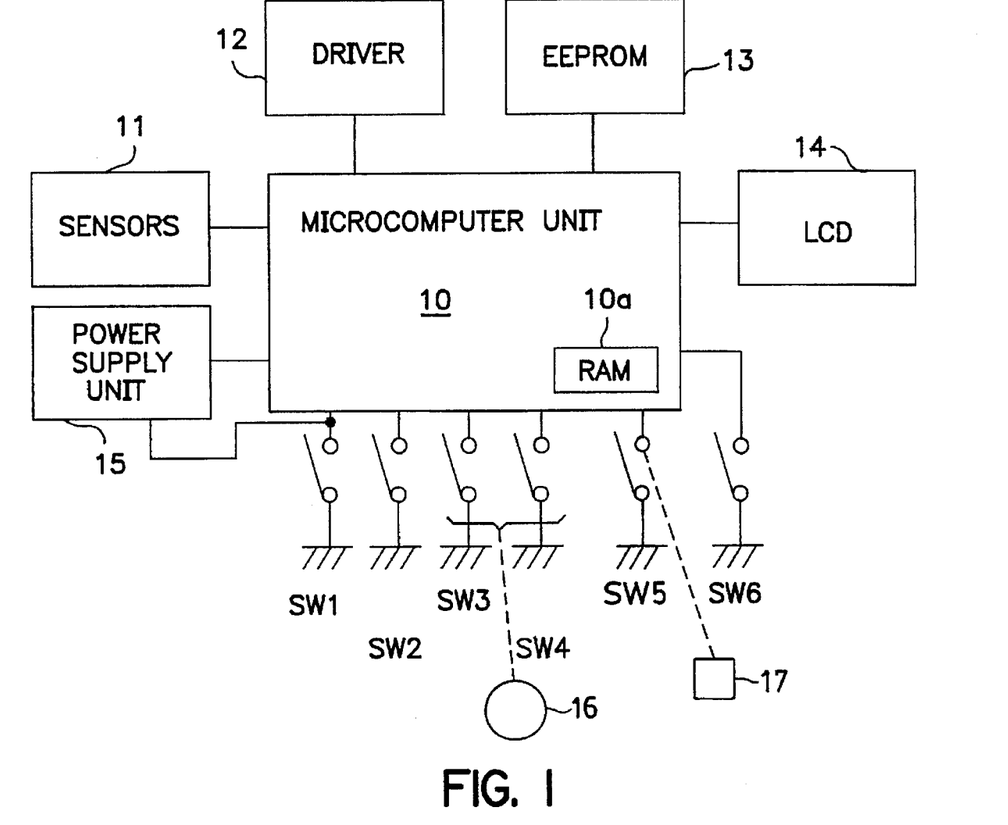
FIG. 1 is a block diagram of a camera control system in accordance with embodiments of the present invention.

An embodiment of the present invention will be described below with reference to FIG. 1. FIG. 1 is a block diagram showing a camera control system for a camera having a mode setting device in accordance with embodiments of the present invention.

The camera control system includes a microcomputer unit 10 (hereinafter referred to as an "MCU") comprised of a CPU, a RAM 10a and like peripheral components, to perform various calculations and camera sequence control, including mode data setting processing. The camera control system also comprises various sensors 11 including a photometric sensor to measure the subject luminosity or brightness, a focus detection sensor to detect the focus adjustment state of the photographic lens, a lens data input circuit to input data from the photographic lens, and the like. The photometric sensor, focus detection sensor and lens data input circuit input photometric data, focus detection data, and lens data, respectively, to the MCU 10.

A driver 12 comprised of a motor and a motor drive circuit receives drive instructions from the MCU 10 and drives motors (not shown) used for focus adjustment, film forwarding, and the like, according to drive instructions received from the MCU 10. A rewriteable non-volatile EEPROM 13 is connected to the MCU 10. The EEPROM 13 stores various data, and maintains its memory contents even after the power supply of the camera has been shut off. A liquid crystal display (LCD) unit 14 is also connected to the MCU 10. The LCD unit 14 includes a display unit and a display drive circuit, and displays various data according to display instructions from the MCU 10.

Various switches are also connected to the MCU 10. These various switches include a half-depression switch SW1 which is closed by a first stroke ("half-depression") of a release button (not shown) and a release switch SW2 which is closed by a second stroke ("full-depression") of the release button. A power supply unit 15 provides a stabilized power supply to all the circuits of the camera when the half-depression switch SW1 is closed. Further, even after the half-depression switch SW1 has been opened, the supply of power to the camera's circuits continues for a fixed period of time, for example for eight (8) seconds, in accordance with instructions received from the MCU 10.

Figure 2:
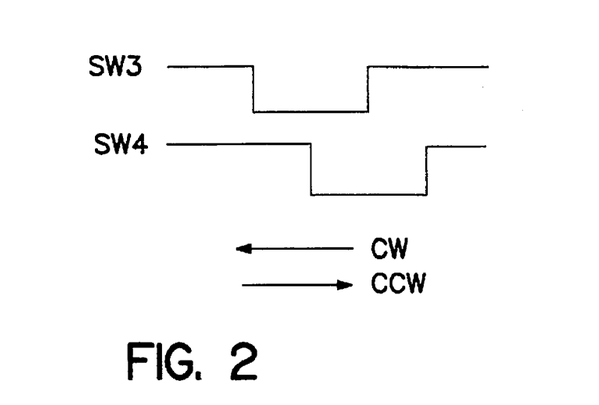
FIG. 2 is a diagram showing the operation of the switches SW3 and SW4 opening and closing in connection with the rotation of a command dial 16 in accordance with embodiments of the present invention.

Switches SW3 and SW4 connect a rotary command dial 16 to the MCU 10. The switches SW3 and SW4 open and close with a mutually predetermined phase difference in connection with the rotary operation of the command dial 16. The command dial 16 acts as a single operating member to set both a focus detection region mode and a focus adjustment mode. The command dial 16 may be arranged on any of the front surface, back surface, top surface, side surface, etc., of the camera. As shown in FIG. 2, when the command dial 16 is rotated in a counterclockwise (CCW) direction, the switch SW3 closes before the switch SW4 closes. Alternatively, when the command dial 16 is rotated in the clockwise (CW) direction, the switch SW4 closes before the switch SW3 closes. As shown in FIG. 2, pulse signals are generated by the opening and closing of the switches SW3, SW4, according to a predetermined amount of rotation of the command dial 16. The switches SW3, SW4 are connected to interrupt terminals of the MCU 10, and initiate generation of interrupts in the MCU 10.

Switch SW5 is a switch which closes when an autofocus (AF) mode button 17 is depressed. When the AF mode button 17 is depressed, it becomes possible to change a focus adjustment mode of the photographic lens according to rotation of the command dial 16. Accordingly, when the command dial 16 is rotated, various combinations of the AF drive mode and the focus detection region mode can be selected, as shown in the table of FIG. 3.

Figure 3:
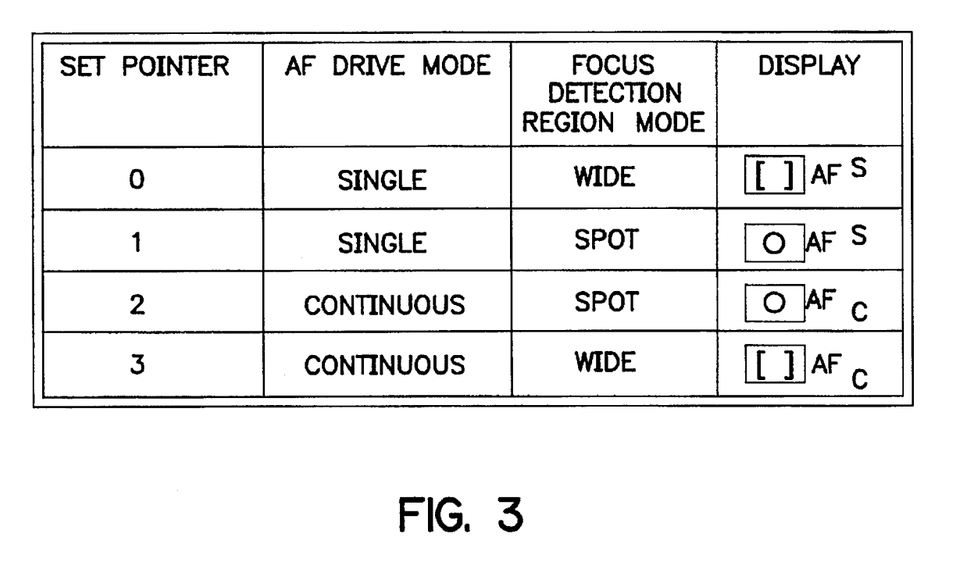
FIG. 3 is a table showing the setting and display of the combinations of the AF drive modes and the focus detection region modes in accordance with embodiments of the present invention.

FIG. 3 is a table showing the setting and display of combinations of the AF drive modes and the focus detection region modes in accordance with embodiments of the present invention. As shown in FIG. 3, the various combinations of the AF drive modes and the focus detection region modes are set according to a "SET POINTER" value indicated in the first column in the table of FIG. 3. Further, a "DISPLAY" column in the table of FIG. 3 shows the display state of the LCD 14 corresponding to each combination of AF drive mode and the focus detection region mode. More specifically, a display segment[] denotes a WIDE mode of the focus detection region; a display segment o denotes a SPOT mode of the focus detection region; a display segment AF denotes the autofocus mode; a display segment S denotes a single AF drive mode; and, a display segment C denotes a continuous AF drive mode.

In the single AF drive mode, when the release button is half-depressed, focus detection of the photographic lens is performed, and focus adjustment is then performed according to the focus detection result, In the single AF drive mode, after the photographic lens has been focused according to the focus adjustment described above, any further focus adjustment movement is inhibited, and the photographic lens is restricted to the present position. In order to perform focus adjustment a second time, the release button has to be opened and then once more half-depressed. The single AF drive mode is the AF mode which is the most frequently used during general photography because the framing can change according to the photographic scene when the photographic lens is focused and with the release button remaining in the half-depressed state.

In the continuous AF drive mode, focus detection and focus adjustment are performed when the release button is half-depressed, and, even after the photographic lens is focused, focus detection and focus adjustment continue as long as the release button is half-depressed. The continuous AF drive mode is the AF drive mode suited to performing photography tracking a moving subject.

Furthermore, in accordance with embodiments of the present invention, the focus adjustment modes have been described as the single AF drive mode and the continuous AF drive mode. However, the focus adjustment modes are not limited to the single AF drive mode and the continuous AF drive mode. For example, a manual mode in which focus adjustment of the photographic lens is performed manually may be included among the focus adjustment modes.

The focus detection region modes include a wide area mode and a spot mode. The wide area focus detection region mode is a mode in which focus detection calculations are performed using signals obtained from an entire region of an AF sensor for focus detection. The wide area focus detection region mode is suitable for the photography of moving subjects or of subjects which extend over a wide range of the photographic picture plane.

The spot area focus detection region mode is a mode in which focus detection calculations are performed using the output of a center portion of the AF sensor. The spot area focus detection region mode is suitable for the photography of stationary subjects located in the center of the photographic picture plane.

In accordance with embodiments of the present invention, the focus detection region modes have been described as the wide area and spot area focus detection region modes. However, the focus detection region modes are not limited to the wide area and spot area focus detection region modes. Further, the spot area focus detection region may be set up in a place outside the center of the photographic picture plane.

The SET POINTER is set to an integer value ranging from zero (0) to three (3), and the AF drive mode and the focus detection region mode are set to respective modes according to the value of the SET POINTER, as shown in FIG. 3. Specifically, when the SET POINTER value is 0, the single AF drive mode and the wide area focus detection region mode are set; when the SET POINTER value is 1, the single AF drive mode and the spot area focus detection region mode are set; when the SET POINTER value is 2, the continuous AF drive mode and the spot area focus detection region mode are set; and, when the SET POINTER value is 3, the continuous AF drive mode and the wide area focus detection region mode are set. The SET POINTER value is stored in the RAM 10a of the MCU 10. Further, the SET POINTER value stored in RAM 10a is transmitted to the EEPROM 13 before the power supply goes OFF, and the SET POINTER value is stored even after the power supply goes OFF.

A switch SW6 connects an autofocus/manual focus (AF/MF) mode selector lever (not shown) to the MCU 10 and opens and closes according to the state of the selector lever. More specifically, when the selector lever is set to the AF mode, the switch SW6 closes and the AF mode is set. When the selector lever is set to the MF mode, the switch SW6 opens and the manual focus (MF) mode is set. Further, when the AF mode is set, the display segment AF of LCD 14 is lighted, as shown in the "DISPLAY" column of FIG. 3.

Further, in accordance with embodiments of the present invention, when the exposure control mode is set to a program automatic exposure mode, the camera automatically sets an exposure value according to a predetermined program chart stored in camera memory. When the command dial 16 is rotated without the AF mode button 17 being depressed, a program shift amount is changed when the program automatic exposure mode is set.

Figure 4:
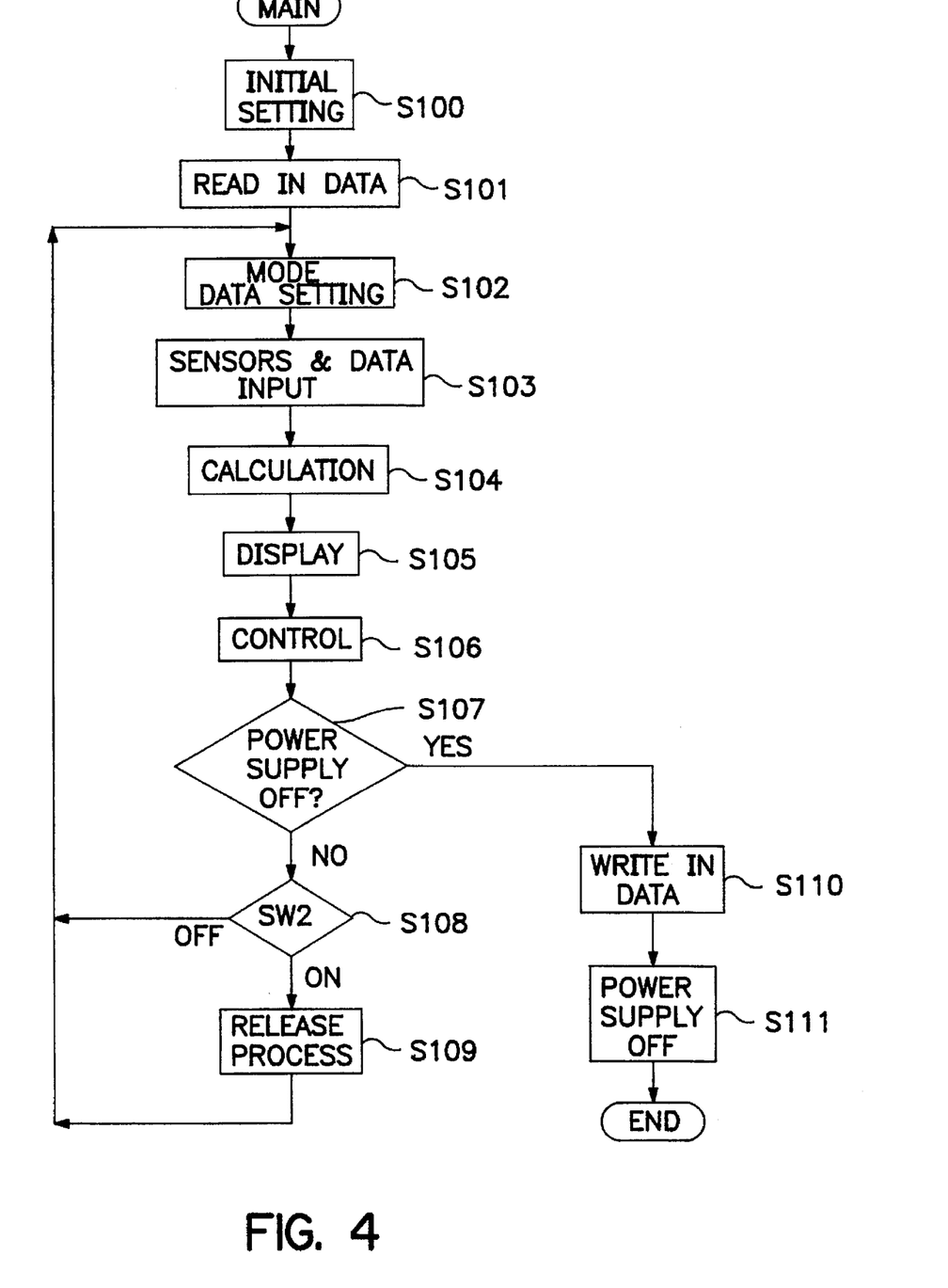
FIG. 4 is a flow chart showing an operational process for performing control of the camera in accordance with embodiments of the present invention.

FIG. 4 is a flow chart showing a main operational process for controlling mode setting with a single operational member in a camera in accordance with embodiments of the present invention. The operational process steps are controlled by the MCU 10.

The operational process shown in FIG. 4 begins when the release button is depressed and the half-depression switch SW1 closes, causing the power supply unit 15 to supply power to all camera circuits including the MCU 10. A power on reset mechanism of the MCU 10 operates in response to the supply of power, and the MCU 10 begins to control the operational process shown in FIG. 4.

In step S100, initial setting of the camera control circuitry is performed, including setting of the internal memory, input/output ports, and the like. After the initial setting of camera control circuitry, the operational process proceeds to step S101, and data stored in the EEPROM 13, such as adjustment data and mode setting data, are read into the RAM 10a of the MCU 10. Next, in step S102, a mode data setting operational process is performed in accordance with the mode data setting operational process shown in FIG. 9, which will be described in detail below with reference to FIG. 9. Data for setting the AF drive mode and focus detection region mode are set during the mode data setting operational process.

Continuing in step S103, photometric data, focus detection data, lens data and the like are input from the respective sensors 11 and, in step S104, exposure calculations and focus detection value calculations are performed based on the data input in step S103. In step S105, the exposure value, focus adjustment state and the like calculation results from step S104 are displayed on the LCD 14. Next, in step S106, focus adjustment of the photographic lens is performed based on the calculation result in step S104, the motor for performing focus adjustment is driven by the driver 12, and focus adjustment of the photographic lens is performed.

In step S107, it is determined whether or not conditions have been established which set the power supply unit 15 OFF. Specifically, it is determined whether or not the operating members of the camera, including the half-depression switch SW1, have been inoperative for a period of eight (8) seconds or more. If it is determined in step S107 that eight (8) seconds or more have elapsed since operation of any of the operating members of the camera, the operational process proceeds to step S110, and, if eight (8) seconds or more have not elapsed, the operational process proceeds to step S108.

In step S108, it is determined whether or not the release button has been operated to a second stroke (full-depression) and the switch SW2 is closed (i.e., ON). If it is determined in step S108 that the switch SW2 is ON, the operational process proceeds to step S109, and, if the switch SW2 is OFF, the operational process returns to step S102. In step S109, the shutter is released, and the driver 12 is driven to perform shutter control according to the exposure value calculated in step S104. Furthermore, raising and lowering of a mirror (not shown), shutter charging, forwarding control and the like, and updating the count of a film counter are performed in step S109.

When the power supply is determined to be in an OFF condition in step S107, the operational process proceeds to step S110, and the data whose settings have been changed during camera operation, for example, during operation of the sensor 11 and the like, are written to a corresponding region of the EEPROM 13. Continuing, in step S111, the operation of the power supply unit 15 is stopped, and the supply of power to the circuits and mechanisms of the camera stops, causing the operation of the MCU 10 to stop and the operational process to end.

FIGS. 5–8 are flow charts showing interrupt operational processes of the switches SW3 and SW4 which open and close in connection with the rotation of the command dial 16.

As described above, the switches SW3, SW4 are connected to interrupt terminals of the MCU 10. When the switches SW3, SW4 open and close accompanying the rotation of the command dial 16, an interrupt is applied to the MCU 10 by the rising edge and falling edge of the input signal to the interrupt terminal connected to the respective switch. Further, directly after the commencement of rotation of the command dial 16, the rising edge of the input signal to the interrupt terminal has priority over the falling edge for either switch SW3, SW4.

As shown in FIG. 2, when the command dial 16 rotates in the counterclockwise (CCW) direction, the switch SW3 closes first, and the input signal to the corresponding MCU 10 interrupt terminal falls. Next, the switch SW4 closes, and the input signal to the corresponding MCU 10 interrupt terminal falls. As the command dial 16 continues to rotate counterclockwise, the switch SW3 opens, and the input signal to the corresponding interrupt terminal rises, followed by the switch SW4 opening and the input signal to the corresponding interrupt terminal rising. Furthermore, as the counterclockwise rotation of the command dial 16 is continued thereafter, the above-described sequence of switches SW3 and SW4 opening and closing repeats.

Figure 5:
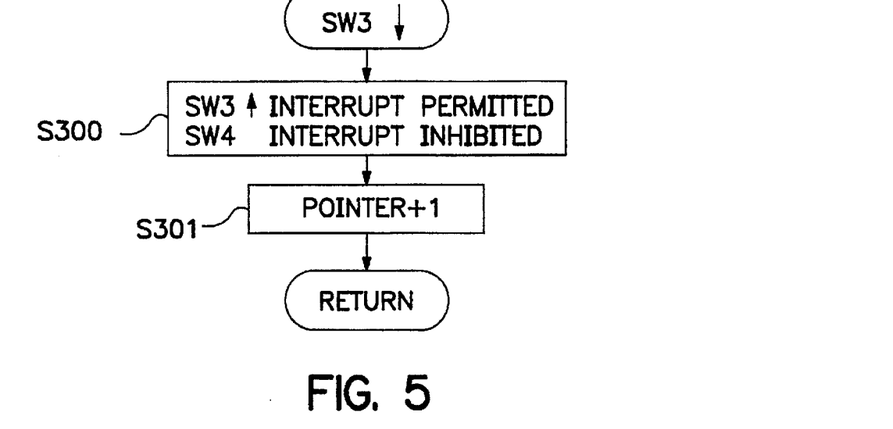
FIG. 5 is a flow chart showing a falling edge interrupt operational process initiated by switch SW3 in accordance with embodiments of the present invention.

FIG. 5 is a flow chart showing an interrupt operational process which is performed in response to a falling edge of an input signal from the switch SW3.

In step S300, a rising edge interrupt is permitted to be initiated by switch SW3, and interrupt due to switch SW4 is inhibited. Continuing, in step S301, a pointer stored in the RAM 10a is incremented, and the operational process returns.

Figure 6:
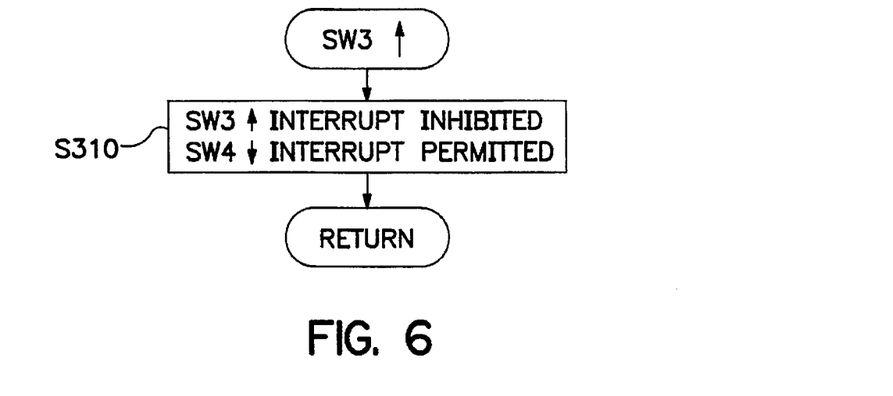
FIG. 6 is a flow chart showing a rising edge interrupt operational process initiated by switch SW3 in accordance with embodiments of the present invention.

FIG. 6 is a flow chart showing an interrupt operational process which is performed in response to a rising edge of an input signal from the switch SW3. The rising edge interrupt initiated by switch SW3 is possible because step S300 of FIG. 5 permits a rising edge interrupt initiated by switch SW3 during the falling edge interrupt operational process of FIG. 5.

In step S310, an interrupt initiated by the rising edge of switch SW3 is inhibited, and an interrupt initiated by a falling edge of switch SW4 is permitted, and the operational process returns.

In summary, when the command dial 16 rotates in a counterclockwise direction, the falling edge interrupt and the rising edge interrupt initiated by the switch SW3 repeatedly arise, and the pointer value is incremented each time. During rotation of the command dial 16 in the counterclockwise direction, the interrupt of the switch SW4 is inhibited, and decrementing the pointer is not performed.

As shown in FIG. 2, when the command dial 16 rotates clockwise (CW), the switch SW4 closes first, and an input signal to the corresponding MCU 10 interrupt terminal falls. Next, as the command dial 16 continues to rotate clockwise, the switch SW3 closes and the input signal to the corresponding MCU 10 interrupt terminal falls. As the command dial 16 continues to rotate, the switch SW4 closes and the input signal to the corresponding MCU 10 interrupt terminal rises, followed by the switch SW3 opening and the input signal to the corresponding interrupt terminal rising. Further, as the clockwise rotation of the command dial 16 is continued thereafter, the opening and closing of switches SW3 and SW4 repeats thereafter.

Figure 7:
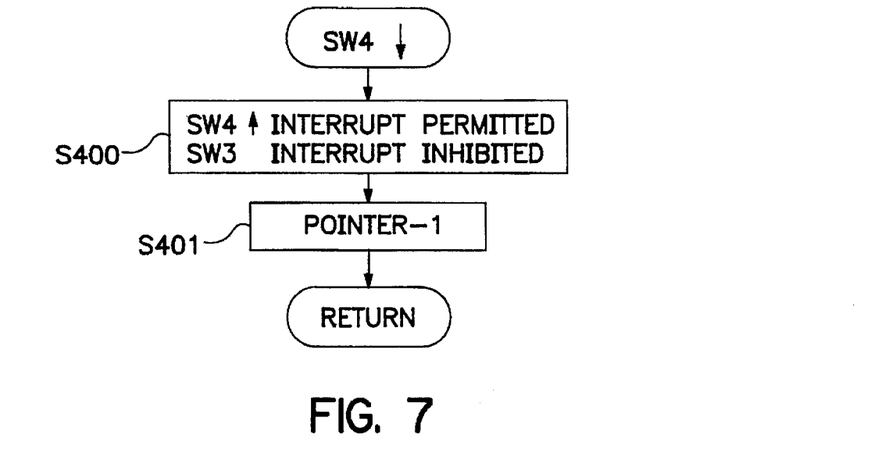
FIG. 7 is a flow chart showing a falling edge interrupt operational process initiated by switch SW4 in accordance with embodiments of the present invention.

FIG. 7 is a flow chart showing an interrupt operational process which is performed in response to a falling edge of the input signal from the switch SW4.

In step S400, an interrupt initiated by the rising edge of switch SW4 is permitted, and an interrupt due to switch SW3 is inhibited. Continuing, in step S301, the pointer stored in RAM 10a is decremented, and the operational process returns.

Figures 8, 9:
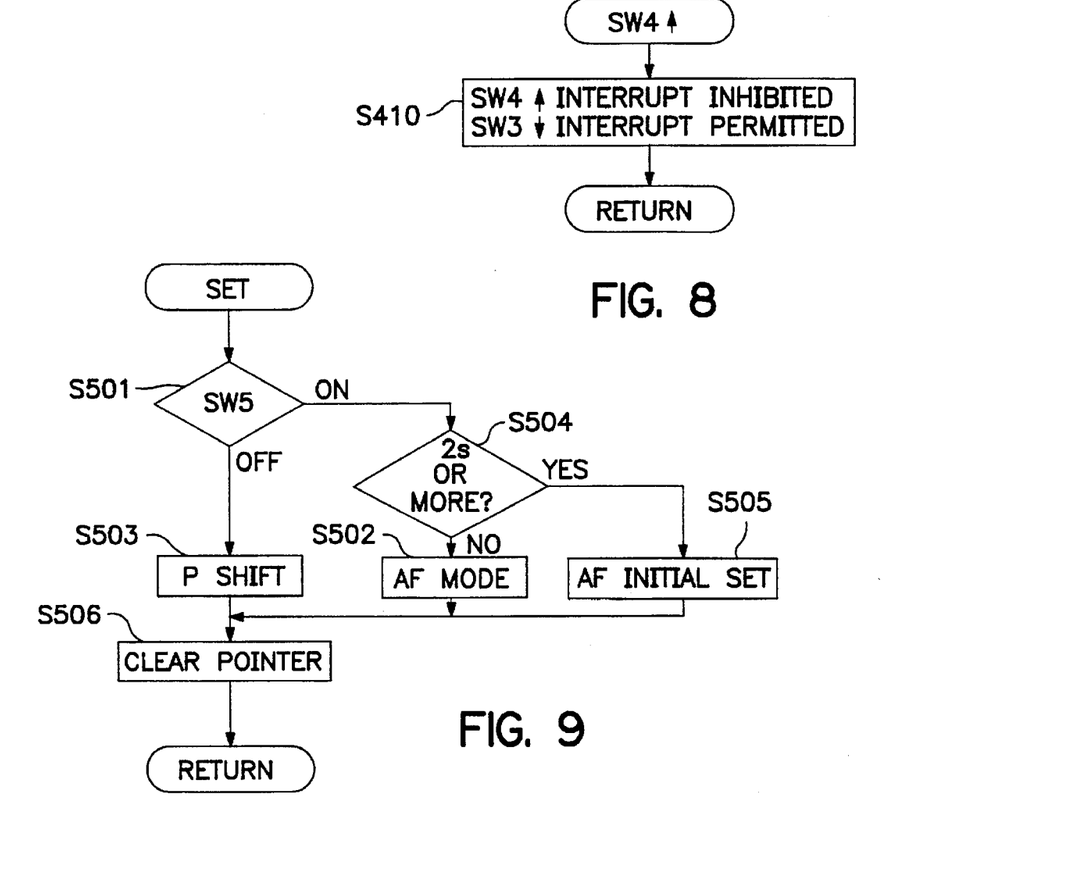
FIG. 8 is a flow chart showing a rising edge interrupt operational process initiated by switch SW4 in accordance with embodiments of the present invention.
FIG. 9 is a flow chart showing a mode data setting operational process in accordance with embodiments of the present invention.

FIG. 8 is a flow chart showing an interrupt operational process which is performed in response to a rising edge of an input signal from the switch SW4. The rising edge interrupt initiated by switch SW4 is possible because step S400 of FIG. 7 permits the rising edge interrupt initiated by switch SW4 during the falling edge interrupt operational process of FIG. 7.

In step S410, an interrupt initiated by the rising edge of switch SW4 is inhibited, and an interrupt initiated by a falling edge of switch SW3 is permitted, and the operational process returns.

In summary, when the command dial 16 rotates in a clockwise direction, the falling edge interrupt and the rising edge interrupt initiated by the switch SW4 repeatedly arise, and the pointer is decremented each time. During rotation of the command dial 16 in the clockwise direction, the interrupt of the switch SW3 is inhibited, and incrementing the pointer is not performed.

FIG. 9 is a flow chart showing a mode data setting operational process in accordance with embodiments of the present invention.

Beginning in step S501, it is determined whether or not the AF mode button 17 has been depressed by determining whether the switch SW5 is ON or OFF. If the AF mode button 17 has been depressed, the switch SW5 is closed (i.e., ON), and the operational process proceeds to step S502. If the AF mode button 17 has not been depressed, the switch SW5 is open (i.e., OFF), and the operational process proceeds to step S503. When the AF mode button 17 has not been depressed, in step S503 the pointer which has been set by the interrupt processes of FIGS. 5–8 is added to a program shift pointer. As described above, when the command dial 16 is rotated without the AF mode button 17 being depressed, a program shift amount is changed when the program automatic exposure mode is set. Continuing, in step S506, the pointer is cleared, and the operational process returns.

When the AF mode button 17 has been depressed, in step S502 it is determined whether or not the switch SW5 remains closed for two (2) seconds or more. More particularly, in step S502 it is determined whether or not the AF mode button 17 has been depressed for two (2) seconds or more. If the AF mode button 17 has been depressed for two (2) seconds or more, the operational process proceeds to step S505. If the AF mode button 17 has not been depressed for two (2) seconds or more, the operational process proceeds to step S504.

In step S504, the pointer which was set in the interrupt process shown in FIGS. 5–8 is added to the SET POINTER of the AF mode stored in the RAM 10a. At this time, when the SET POINTER exceeds four (4), the SET POINTER is set to 0, and if the SET POINTER becomes negative, the SET POINTER is set to three (3). After adding the pointer value to the SET POINTER, the pointer is cleared in step S506, and the operational process returns.

When the AF mode button 17 is depressed for two (2) seconds or more, in step S505 an initial setting is performed to set the SET POINTER of the AF mode to zero (0), thereby initially setting the AF drive mode to the single AF drive mode, and the focus detection region mode to the wide area mode.

In summary, when the command dial 16 is rotated with the AF mode button 17 not depressed, the program shift pointer is increased or decreased according to the direction of rotation and the amount of rotation of the command dial 16, and the program shift amount is set in the program automatic exposure mode.

Alternatively, when the command dial 16 is rotated while depressing the AF mode button 17, the SET POINTER of the AF mode is increased or decreased according to the direction of rotation and the amount of rotation of the command dial 16, and the operation of changing the combination of the AF drive mode and the focus detection region mode, as shown in FIG. 3, becomes possible. At this time, with the AF mode SET POINTER at 0, when the pointer is −1, the SET POINTER becomes 3. However, with the AF mode SET POINTER at 3, when the pointer is +1 the SET POINTER becomes 0. Specifically, when the command dial 16 rotates in the counterclockwise direction, the SET POINTER changes in the sequence 0→1→2→3→0, while when the command dial 16 rotates in the clockwise direction, the SET POINTER changes in the sequence 3→2→1→0→3, and the combination of the AF drive mode and the focus detection region mode change as shown in the table of FIG. 3.

Furthermore, when the AF mode button 17 continues to be depressed for two (2) seconds or more, the AF mode SET POINTER is initialized to zero (0), and the combination of the single AF drive mode and the wide area focus detection region mode are set. For example, even if the continuous AF drive mode and the spot area focus detection region mode are selected, when the AF mode button 17 is continuously depressed for two (2) seconds or more, the operation mode is set to the above-described initial values.

In accordance with the embodiments of the present invention described above, the respective operation modes of the AF drive mode and the focus detection region mode are not simultaneously changed, but either one of the AF drive mode and focus detection region mode is changed as the SET POINTER value changes. Specifically, as shown in FIG. 3, when the SET POINTER changes from 0 to 1, the single AF drive mode remains unchanged, and the focus detection region mode changes from the wide area mode to the spot area mode; when the SET POINTER changes from 1 to 2, the focus detection region mode remains unchanged in the spot mode, and the single AF drive mode is changed to the continuous AF drive mode. Similarly, when the set pointer changes from 2 to 3, the AF drive mode remains unchanged in the continuous mode, and the focus detection region mode changes from the spot mode to the wide mode; when the SET POINTER changes from 3 to 0, the focus detection region mode remains unchanged in the wide area mode, and the AF drive mode changes from the continuous AF drive mode to the single AF drive mode. Furthermore, as can be seen from FIG. 3, when the command dial 16 is rotated in the clockwise direction, the AF drive mode and the focus detection region mode do not simultaneously change.

Therefore, in accordance with embodiments of the invention, the user is not confused by a simultaneous change of the AF drive mode and the focus detection region mode, and the desired mode can be quickly set.

Figure 10:
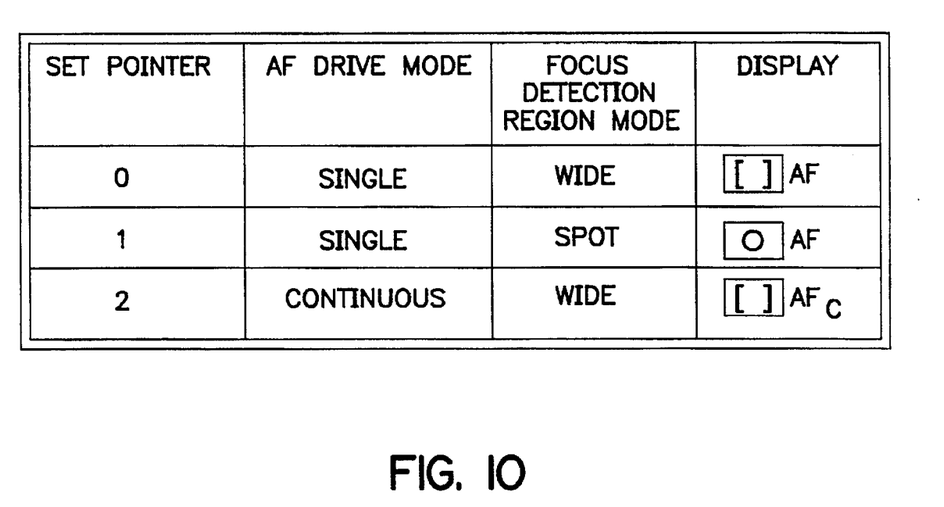
FIG. 10 is a table showing an example of the setting and displaying of the combinations of the AF drive modes and focus detection region modes in accordance with an embodiment of the present invention.

FIG. 10 shows an example of a modification of the embodiment of the invention of FIGS. 1–9. As shown in FIG. 10, the combinations of AF drive mode and focus detection region mode exclude the combination of the continuous AF drive mode and the spot area focus detection region mode. This combination is excluded because, as described above, photography is usually performed in the continuous AF mode while tracking a moving subject.

However, tracking a moving subject which easily leaves the focus detection region becomes difficult when performing focus detection in the spot area focus detection region. Accordingly, because the continuous AF drive mode and the spot area focus detection region mode are seldom used, there is no particular problem in eliminating the combination of the continuous AF drive mode and the spot mode. Further, ease of use is improved by reducing the number of combinations of modes.

Furthermore, in accordance with the embodiment of the invention shown in FIG. 10, the display segment S is not used to represent the single AF mode. An example of the LCD 14 with the display segment S eliminated is shown in FIG. 10. Accordingly, the number of display segments can be reduced. Alternatively, the display segment S may also be displayed as priority or, as in the embodiment shown in FIG. 3, the display segments S and C may both be displayed.

Figure 11:
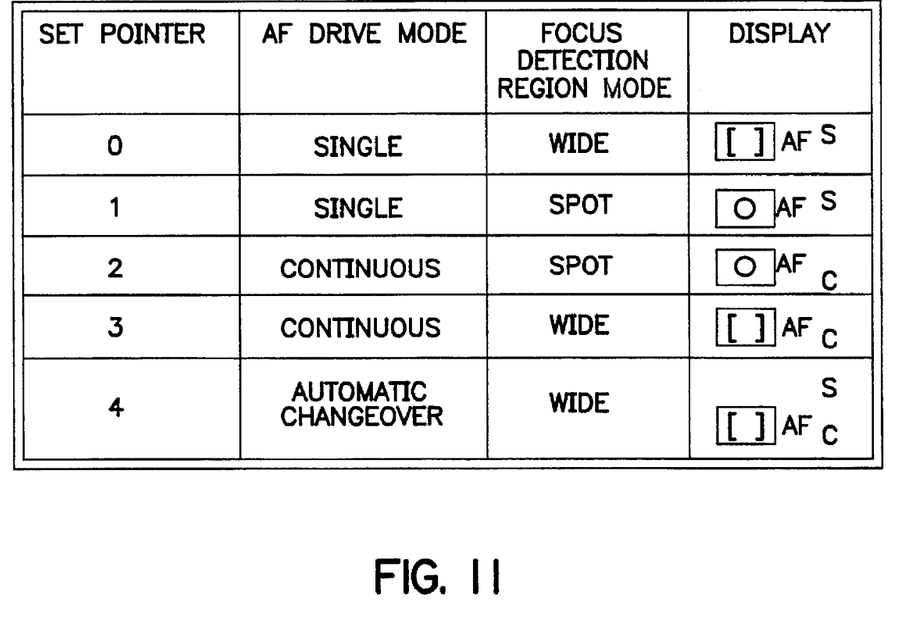
FIG. 11 is a table showing an example of the setting and displaying of the combinations of the AF drive modes and focus detection region modes in accordance with embodiments of the present invention.

FIG. 11 shows another modification of the embodiment of the invention shown in FIGS. 1–9. As shown in FIG. 11, the AF drive mode includes an automatic changeover mode. In the automatic changeover mode, the motion of a subject is discriminated and the AF mode of operation is automatically changed between the continuous AF mode and the single AF mode according to the discriminated motion. For example, if a stationary subject is discriminated, by suspending rangefinding movement, changing the framing is possible with the focus unchanged. If a moving subject is discriminated, by interrupting focusing movement the tracking of a moving subject becomes possible. Consequently, in the automatic changeover mode the necessity for the spot mode is small, and tracking is performed with only the wide area focus detection region mode. To display the automatic changeover mode, "S" and "C" are simultaneously lit on the LCD 14. However, the display state is not limited to this, and other display states are possible.

In accordance with the embodiment of the invention shown in FIG. 11, when the SET POINTER is changed in the order 3→4→0 or the reverse order, the three AF drive modes (continuous, automatic changeover and single) can be changed with the wide area focus detection region mode remaining unchanged. Moreover, the automatic changeover mode may be selected in the initial setting.

In accordance with embodiments of the present invention, combinations of plural focus detection region modes and plural focus adjustment modes are set and changed using a single operating member, thereby reducing the number of operating members required for the camera. Further, operability increases and the space and cost for arranging operating members can be reduced.

In accordance with embodiments of the present invention, because the most frequently used combination of the wide area focus detection region mode and the single AF drive mode are set in the initial state of the camera, changing of modes relating to the focus adjustment of the photographic lens becomes unnecessary at a time of normal photography, and the ease of camera use is improved.

In accordance with embodiments of the present invention, the focus detection region mode and the focus adjustment mode are not simultaneously changed, but either of the modes is changed individually in response to rotation of the command dial 16. Accordingly, simultaneous changing of two modes at the same time, which would be puzzling to the user, is not performed, and a quick setting to the desired mode is possible.

In accordance with embodiments of the present invention, the combination of the continuous drive mode and the spot focus detection region mode may be eliminated, thereby eliminating a combination of modes which is not used in normal photography and facilitating an easier operation of changing camera modes.

Although preferred embodiments of the invention have been shown and described, it will be appreciated by those skilled in the art that changes may be made in these embodiments without departing from the principles and spirit of the invention, the scope of which is defined in the appended claims and their equivalents.

What is claimed is:

1. A camera, comprising:

a focus detection device to detect a focus adjustment state of a photographic lens, the focus detection device being operable in a plurality of modes including a first focus detection region mode in which focus detection of the photographic lens is performed in a first focus detection region of a photographic picture plane, and a second focus detection region mode of operation in which focus detection of the photographic lens is performed in a second focus detection region of the photographic picture plane, the second focus detection region being narrower than the first focus detection region;

a focus adjustment device to perform focus adjustment of the photographic lens based on detection results of the focus detection device, the focus adjustment device being operable in a plurality of modes including a first drive mode wherein focus adjustment movement is inhibited after the photographic lens is focused, and a second drive mode wherein focus adjustment movement is continued after focusing the photographic lens;

a mode data setting device to set a mode value corresponding to a combination of a focus detection region mode of operation and a focus adjustment device mode of operation, wherein the mode data setting device sets respective mode values corresponding to each combination of modes of operation of the focus detection device and focus adjustment device; and a control unit to control the focus detection device and focus adjustment device to operate in the focus detection region mode of operation and focus adjustment device mode of operation corresponding to the mode value set by the mode data setting device.

2. A camera as recited in claim 1, wherein the mode data setting device comprises:

an autofocus mode button to set an autofocus mode of camera operation when the autofocus mode button is depressed; and a rotatable command dial to simultaneously set a mode value corresponding to a combination of modes of operation of the focus detection device and the focus adjustment device according to signals produced by rotation of the command dial when the autofocus mode button is depressed.

3. A camera as recited in claim 2, wherein the mode data setting device sets an initial mode value corresponding to a combination of the first focus detection region mode and the first focus adjustment mode when the autofocus mode button is depressed for at least two seconds.

4. A camera as recited in claim 2, wherein the respective focus adjustment mode of operation and focus detection region mode of operation are changed individually in response to rotation of the command dial.

5. A camera as recited in claim 1, wherein the mode data setting device excludes setting a mode value corresponding to a combination of the second focus detection region mode and the second focus adjustment mode.

6. A camera as recited in claim 2, further comprising:

a memory to store the mode value set by the mode data setting device, wherein the mode value stored in memory is incremented by rotating the command dial in the counterclockwise direction, and the mode value stored in memory is decremented by rotating the command dial in a clockwise direction.

7. A camera as recited in claim 1, further comprising:

a display to display the focus adjustment mode and focus detection region mode of operation corresponding to the mode value set by the mode data setting device.

8. A camera as recited in claim 1, wherein the focus adjustment device is operable in a third drive mode wherein focus adjustment movement is automatically changed between the first drive mode and the second drive mode, and the mode data setting device sets a mode value corresponding to a combination of the third drive mode and the first focus detection region mode.

9. A camera as recited in claim 1, wherein the first focus detection region mode is a wide mode and the second focus detection region mode is a spot mode.

10. A device for setting camera operation modes in a camera having plural focus detection region modes of operation and plural focus adjustment modes of operation, comprising:

a mode setting device to simultaneously set, with a single operating member, a mode of camera operation corresponding to a combination of focus detection region mode of operation and focus adjustment mode of operation, wherein the plural focus detection region modes of operation include a first focus detection region mode and a second focus detection region mode, and the plural focus adjustment modes of operation include a first drive mode and a second drive mode, and the mode setting device simultaneously sets any combination of focus detection region mode of operation and focus adjustment mode of operation; and a control unit to control operation of the camera according to the selected mode of operation set by the mode setting device.

11. A device as recited in claim 9, wherein the mode setting device automatically sets an initial mode of operation corresponding to a combination of the first focus detection region mode and the first focus adjustment mode.

12. A device as recited in claim 9, wherein the respective focus adjustment mode of operation and focus detection region mode of operation are changed individually in response to the mode setting device setting a new combination of modes.

13. A device as recited in claim 9, wherein the mode setting device excludes setting a combination of modes corresponding to the second focus detection region mode and the second focus adjustment mode.

14. A device as recited in claim 9, wherein the mode setting device comprises:

a rotatable command dial to produce signals according to rotation of the command dial, wherein the signals produced by the command dial change the plurality of modes of camera operation; and a data setting device to change a mode value according to the signals produced by rotation of the command dial, wherein the mode value specifies a combination of the plurality of modes of camera operation, and the control unit controls camera operation according to the mode value.

15. A device as recited in claim 14, further comprising:

a memory to store the mode value set by the data setting device, wherein the mode value stored in memory is incremented by rotating the command dial in the counterclockwise direction, and the mode value stored in memory is decremented by rotating the command dial in a clockwise direction.

16. A device as recited in claim 15, further comprising a display to display the focus adjustment mode and focus detection region mode of operation corresponding to the mode value set by the data setting device.

* * * * *